United States Patent
Ogawa

(10) Patent No.: US 12,162,468 B2
(45) Date of Patent: Dec. 10, 2024

(54) TRAVEL SUPPORT CONTROL DEVICE FOR HYBRID ELECTRIC VEHICLE

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 249 days.

(21) Appl. No.: 17/843,172

(22) Filed: Jun. 17, 2022

(65) Prior Publication Data

US 2023/0023090 A1    Jan. 26, 2023

(30) Foreign Application Priority Data

Jul. 21, 2021    (JP) ................. 2021-120355

(51) Int. Cl.
*B60W 20/12*    (2016.01)
*B60W 50/08*    (2020.01)
*G01C 21/34*    (2006.01)

(52) U.S. Cl.
CPC .......... *B60W 20/12* (2016.01); *B60W 50/082* (2013.01); *G01C 21/3461* (2013.01); *G01C 21/3469* (2013.01); *B60W 2756/10* (2020.02)

(58) Field of Classification Search
CPC ............... B60W 20/12; B60W 50/082; B60W 2756/10; B60W 2556/50; B60W 10/06; B60W 10/08; B60W 50/0097; G01C 21/3461; G01C 21/3469

See application file for complete search history.

(56) References Cited

U.S. PATENT DOCUMENTS

| | | | | |
|---|---|---|---|---|
| 9,057,621 | B2 * | 6/2015 | Tate, Jr. ................ | B60W 20/13 |
| 10,899,338 | B2 * | 1/2021 | Lee ........................ | B60W 40/10 |
| 10,919,517 | B2 * | 2/2021 | Lee ........................ | F02D 35/00 |
| 2011/0246004 | A1 * | 10/2011 | Mineta ................... | B60W 20/11 |
| | | | | 903/903 |
| 2016/0137184 | A1 | 5/2016 | Hokoi et al. | |
| 2016/0325726 | A1 * | 11/2016 | Liang .................... | B60W 10/06 |
| 2017/0334437 | A1 * | 11/2017 | Mikami ................. | B60W 20/50 |
| 2021/0114616 | A1 * | 4/2021 | Altman .............. | G01C 21/3889 |

FOREIGN PATENT DOCUMENTS

| | | |
|---|---|---|
| JP | 2014-151760 A | 8/2014 |
| JP | 2016-097697 A | 5/2016 |
| JP | 2020-067946 A | 4/2020 |
| JP | 2020-153903 A | 9/2020 |

\* cited by examiner

*Primary Examiner* — Kyle T Johnson
(74) *Attorney, Agent, or Firm* — Sughrue Mion, PLLC

(57) ABSTRACT

A travel support control device creates a travel support plan in which one of travel modes including a charge depleting (CD) mode and a charge sustaining (CS) mode is assigned to each travel section of a travel route based on prediction information generated for the travel route, performs travel support control, and calculates a total distance of electric traveling on the travel route as one result of the travel support control. When a hybrid electric vehicle is traveling in an area outside of communication coverage while the travel support control is being performed, the travel support control device stops switching the travel mode based on the travel support plan and keeps calculating the total distance of electric traveling on the travel route.

5 Claims, 3 Drawing Sheets

TRAVEL SUPPORT CONTROL DEVICE FOR HYBRID ELECTRIC VEHICLE

CROSS-REFERENCE TO RELATED APPLICATION

This application claims priority to Japanese Patent Application No. 2021-120355 filed on Jul. 21, 2021, incorporated herein by reference in its entirety.

BACKGROUND

1. Technical Field

The disclosure relates to a travel support control device for a hybrid electric vehicle and more particularly to a travel support control device for a hybrid electric vehicle that travels by creating a travel support plan in which travel modes are assigned to travel routes.

2. Description of Related Art

In the related art, a travel support control device that selects one of an electric travel mode (an EV mode) and a hybrid travel mode (an HV mode) for each section other than one or more sections immediately before a destination on a travel route from a current location to a destination was proposed as such a type of travel support control device for a hybrid electric vehicle (for example, see Japanese Unexamined Patent Application Publication No. 2014-151760 (JP 2014-151760 A)). With this device, the running cost of a hybrid electric vehicle as a whole can be additionally reduced through the aforementioned control.

SUMMARY

Recently, a navigation system (such as a cloud navigation system) that acquires map information, route information, and the like from an external server via a radio communication line has also been proposed. When a hybrid electric vehicle having such a navigation system mounted therein travels in an area outside of communication coverage while travel support control for causing the hybrid electric vehicle to travel by assigning the EV mode and the HV mode to each section is being performed, map information or route information may not be able to be acquired and switching between the EV mode and the HV mode may not be able to be appropriately performed.

The disclosure provides a travel support control device for a hybrid electric vehicle in which a navigation system acquiring map information and the like from an external server via a radio communication line is mounted and which can more appropriately cope with a case in which the hybrid electric vehicle travels in an area outside of communication coverage while travel support control is being performed.

A travel support control device for a hybrid electric vehicle according to the disclosure employs the following configurations.

A travel support control device for a hybrid electric vehicle according to the disclosure is a travel support control device for a hybrid electric vehicle including an engine, a motor, a battery, and a navigation system that receives map information from an external management server by communication, stores the received map information in a map information storage area, and performs route guidance for a travel route from a current location to a destination, the travel support control device performing travel support control in which a travel support plan in which one of travel modes including a CD mode and a CS mode is assigned to each travel section of the travel route based on prediction information generated for the travel route is created and the hybrid electric vehicle travels according to the travel support plan and calculating a total distance of electric traveling on the travel route as one result of the travel support control. The travel support control device is configured to stop switching the travel mode based on the travel support plan and to keep calculating the total distance of electric traveling on the travel route when the hybrid electric vehicle is traveling in an area outside of communication coverage in which communication between the navigation system and the management server is not possible while the travel support control is being performed.

The hybrid electric vehicle in which the travel support control device for a hybrid electric vehicle according to the disclosure is mounted includes an engine, a motor, a battery, and a navigation system that receives map information from an external management server by communication, stores the received map information in a map information storage area, and performs route guidance for a travel route from a current location to a destination. The travel support control device performs travel support control in which a travel support plan in which one of travel modes including a CD mode and a CS mode is assigned to each travel section of the travel route based on prediction information generated for the travel route is created and the hybrid electric vehicle travels according to the travel support plan. At this time, the travel support control device calculates a total distance of electric traveling on the travel route as one result of the travel support control. The travel support control device is configured to stop switching the travel mode based on the travel support plan and to keep calculating the total distance of electric traveling on the travel route when the hybrid electric vehicle is traveling in an area outside of communication coverage in which communication between the navigation system and the management server is not possible. Accordingly, it is possible to more appropriately cope with a case in which the hybrid electric vehicle is traveling in an area outside of the communication coverage while the travel support control is being performed and to keep calculating the total distance of electric traveling on the travel route as one result of the travel support control.

In the travel support control device according to the disclosure, the travel support control device may be configured to perform switching the travel mode based on the travel support plan when the hybrid electric vehicle is traveling in an area outside of the communication coverage and in a range of the map information stored in the map information storage area while the travel support control is being performed and to stop switching the travel mode based on the travel support plan when the hybrid electric vehicle is traveling in an area outside of the communication coverage and outside of the range of the map information stored in the map information storage area. With this configuration, it is possible to perform the travel support plan in the range of the map information stored in the map information storage area.

In the travel support control device according to the disclosure, the travel support control device may be configured to maintain the travel mode (the CD mode or the CS mode) for when switching the travel mode based on the travel support plan is stopped when switching the travel mode based on the travel support plan is stopped. The travel support control device may be configured to maintain a traveling state (an electric traveling state or a hybrid traveling state) for when switching the travel mode based on the travel support plan is stopped when switching the travel mode based on the travel support plan is stopped. The travel support control device may cause the hybrid electric vehicle to travel by switching between electric traveling and hybrid traveling based on an accelerator operation amount, a vehicle speed, or a state of charge of the battery.

In the travel support control device according to the disclosure, the travel support control device may be configured to return to switching the travel mode based on the travel support plan when the communication between the navigation system and the management server is restored from a state in which switching the travel mode based on the travel support plan is stopped due to the hybrid electric vehicle traveling in an area outside of the communication coverage. With this configuration, it is possible to keep performing the travel support plan.

In the travel support control device according to the disclosure, the travel support control device may be configured to notify of the total distance of electric traveling on the travel route when switching the travel mode based on the travel support plan is stopped due to the hybrid electric vehicle traveling in an area outside of the communication coverage and the hybrid electric vehicle has reached the destination. With this configuration, even when the hybrid electric vehicle travels in an area outside of the communication coverage, it is possible to notify a driver or the like of the total distance of electric traveling on the travel route as one result of the travel support control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
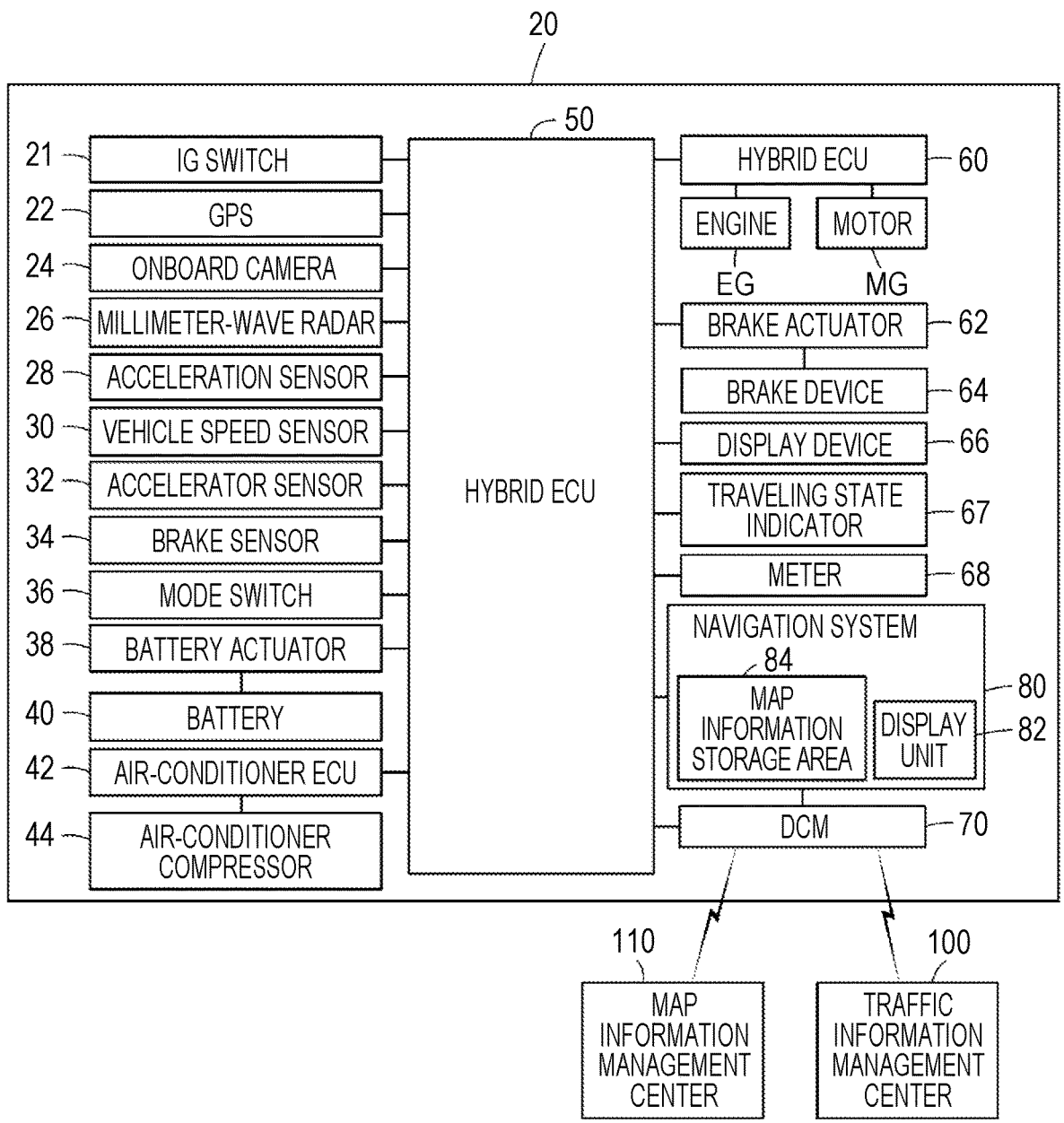
FIG. 1 is a block diagram illustrating an example of a configuration of a travel support control device for a hybrid electric vehicle 20 according to an embodiment of the disclosure with a hybrid ECU 50 as a central block.

Hereinafter, a mode for carrying out the disclosure will be described with reference to an embodiment. FIG. 1 is a block diagram illustrating an example of a configuration of a travel support control device for a hybrid electric vehicle 20 according to an embodiment of the disclosure with a hybrid electronic control unit (hereinafter referred to as a hybrid ECU) 50 as a central block. The electronic control unit 50 corresponds to the travel support control device. The hybrid electric vehicle 20 according to the embodiment includes an engine EG and a motor MG as power sources as illustrated in the drawing. The hybrid electric vehicle 20 according to the embodiment travels while switching a travel mode between a charge depleting mode (CD mode) in which electric traveling has priority such that a state of charge SOC of a battery 40 decreases and a charge sustaining mode (CS mode) in which electric traveling and hybrid traveling are used together such that the state of charge SOC of the battery 40 is sustained at a target value. Electric traveling is a mode in which the hybrid electric vehicle travels using only power from the motor MG in a state in which operating of the engine EG has been stopped, and hybrid traveling is a mode in which the engine EG operates and the hybrid electric vehicle travels using power from the engine EG and power from the motor MG.

The hybrid electric vehicle 20 according to the embodiment includes an ignition switch 21, a Global Positioning System (global positioning satellite) (GPS) unit 22, an onboard camera 24, a millimeter-wave radar 26, an acceleration sensor 28, a vehicle speed sensor 30, an accelerator sensor 32, a brake sensor 34, a mode switch 36, a battery actuator 38, a battery 40, an air-conditioner electronic control unit (hereinafter referred to as an air-conditioner ECU) 42, an air-conditioner compressor 44, a hybrid ECU 50, an accelerator actuator 60, a brake actuator 62, a brake device 64, a display device 66, a traveling state indicator 67, a meter 68, a data communication module (DCM) 70, and a navigation system 80 in addition to the power source.

The GPS unit 22 is a device that detects a position of a vehicle based on signals transmitted from a plurality of GPS satellites. The onboard camera 24 is a camera that images surroundings of the vehicle and corresponds to, for example, a front camera that images a front view of the vehicle or a rear camera that images a rear view of the vehicle. The millimeter-wave radar 26 detects an inter-vehicle distance or a relative speed between the host vehicle and a front vehicle or detects an inter-vehicle distance or a relative speed between the host vehicle and a rear vehicle.

The acceleration sensor 28 is, for example, a sensor that detects an acceleration in a longitudinal direction of the vehicle or detects an acceleration in a right-left direction (a lateral direction) of the vehicle. The vehicle speed sensor 30 detects a vehicle speed of the vehicle based on wheel speeds and the like. The accelerator sensor 32 detects an accelerator operation amount or the like corresponding to an amount of depression of an accelerator pedal by a driver. The brake sensor 34 detects a brake position or the like which is an amount of depression of a brake pedal by the driver. The mode switch 36 is a switch that is provided in the vicinity of a steering wheel in a driver's seat and switches between a CD mode and a CS mode.

The battery actuator 38 detects conditions such as an inter-terminal voltage, a charging/discharging current, and a battery temperature of the battery 40 and manages the battery 40 based on the results of detection. The battery actuator 38 calculates a state of charge SOC which is a ratio of a residual storage capacity to a full storage capacity based on the charging/discharging current or calculates an allowable maximum output electric power (an output limit Wout) which may be output from the battery 40 or an allowable maximum input electric power (an input limit Win) which may be input to the battery 40 based on the state of charge SOC, the battery temperature, and the like. The battery 40 is configured as a rechargeable secondary battery and, for example, a lithium ion battery, a nickel-hydride battery, or a lead storage battery can be used.

The air-conditioner ECU 42 is configured as a microcomputer that is not shown but includes a CPU as a major constituent, and includes a ROM, a RAM, a flash memory, an input port, an output port, and a communication port in addition to the CPU. The air-conditioner ECU 42 is assembled into an air conditioner that conditions air of a cabin and controls driving of the air-conditioner compressor 44 in the air conditioner such that the temperature of the cabin reaches a set temperature.

The engine EG is configured as, for example, an internal combustion engine. The motor MG is configured as, for example, an electric motor that also serves as a power generator such as a synchronous generator motor. The motor MG is connected to the battery 40 via an inverter which is not illustrated and can output a driving force using electric power supplied from the battery 40 or charge the battery 40 with electric power generated therein.

The hybrid ECU 50 is configured as a microcomputer that is not shown but includes a CPU as a major constituent, and includes a ROM, a RAM, a flash memory, an input port, an output port, and a communication port in addition to the CPU. The hybrid ECU 50 sets a travel mode or sets a target operating point (a target rotation speed or a target torque) of the engine EG or a torque command for the motor MG based on the set travel mode, the accelerator operation amount from the accelerator sensor 32, the brake position from the brake sensor 34, and the output limit and the input limit from the battery actuator 38. The hybrid ECU 50 is not started in an accessory-on state but is started in a ready-on state.

In electric traveling, the hybrid ECU 50 sets a required driving force or a required power based on the accelerator operation amount from the accelerator sensor 32 or the vehicle speed from the vehicle speed sensor 30, sets a torque command for the motor MG such that the required driving force or the required power is output to the hybrid electric vehicle, and transmits the set torque command to the accelerator actuator 60. In hybrid traveling, the hybrid ECU 50 sets a target operating point for the engine EG and a torque command for the motor MG such that the required driving force or the required power is output to the vehicle and transmits the target operating point and the torque command to the accelerator actuator 60. When the brake pedal is depressed, the hybrid ECU 50 sets a required braking force based on the brake position from the brake sensor 34 or the vehicle speed from the vehicle speed sensor 30, sets a regenerative torque command for controlling regeneration of the motor MG based on the required braking force or the vehicle speed, sets a target braking force for a brake device, transmits the torque command to the accelerator actuator 60, and transmits the target braking force to the brake actuator 62.

The accelerator actuator 60 controls driving of the engine EG or the motor MG based on the target operating point or the torque command set by the hybrid ECU 50. The accelerator actuator 60 performs intake air amount control, fuel injection control, ignition control, intake valve opening/closing timing control, and the like such that the engine EG operates at the target operating point (a target rotation speed or a target torque). The accelerator actuator 60 controls switching of switching elements of the inverter for driving the motor MG such that a torque corresponding to the torque command is output from the motor MG.

The brake actuator 62 controls the brake device 64 such that the target braking force set by the hybrid ECU 50 is applied to the vehicle by the brake device 64. The brake device 64 is configured as, for example, a hydraulic frictional brake.

The display device 66 is assembled into, for example, an instrument panel in front of a driver's seat and displays various types of information. The traveling state indicator 67 includes an EV indicator and an HV indicator which are not illustrated, turns on the EV indicator and turns off the HV indicator in electric traveling, and turns off the EV indicator and turns on the HV indicator in hybrid traveling. The meter 68 is assembled into, for example, the instrument panel in front of the driver's seat.

The DCM 70 transmits information of the host vehicle to a traffic information management center 100 or receives road traffic information from the traffic information management center 100. Examples of the information of the host vehicle include a position, a vehicle speed, a traveling power, and a travel mode of the host vehicle. Examples of the road traffic information include information on current or future congestion, information on a predicted value of a current average vehicle speed or a future average vehicle speed in sections of a travel route, information on traffic regulations, information on weather, information on road surface conditions, and information on maps. The DCM 70 communicates with the traffic information management center 100 at intervals of a predetermined time (for example, at intervals of 30 seconds, 1 minute, or 2 minutes).

The navigation system 80 is a system that guides the host vehicle to a set destination and includes a display unit 82 and a map information storage area 84. The navigation system 80 communicates with a map information management center 110 via the DCM 70, acquires map information from the map information management center 110 within the range of capacity of the map information storage area 84, stores the acquired map information in the map information storage area 84, and displays map information stored in the map information storage area 84 on the display unit 82 according to necessity. The navigation system 80 communicates with the traffic information management center 100 via the DCM 70. When a destination is set, the navigation system 80 sets a route based on information of the destination, information of a current location (a current position of the host vehicle) acquired by the GPS unit 22, and map information stored in the map information storage area 84. The navigation system 80 stores the map information in the map information storage area 84 by communicating with the map information management center 110 according to necessity, acquires road traffic information by communicating with the traffic information management center 100 at intervals of a predetermined time (for example, at intervals of 3 minutes or 5 minutes), and performs route guidance based on the map information and the road traffic information.

In the route guidance, the navigation system 80 generates load information and the like required for traveling in each travel section as prediction information based on information of each travel section or information of a travel load on the travel route in the road traffic information acquired from the traffic information management center 100, the vehicle speed of the host vehicle, the travel power of the host vehicle, the travel mode of the host vehicle, and the like and transmits the generated prediction information to the hybrid ECU 50 whenever road traffic information is acquired from the traffic information management center 100 (or at intervals of a predetermined time). The prediction information includes information of the host vehicle such as a position, a vehicle speed, a travel power, and a travel mode of the host vehicle, information on current or future congestion, information on a predicted value of a current average vehicle speed or a future average vehicle speed in sections of the travel route, information on traffic regulations, information on weather, information on road surface conditions, and information on maps.

Figure 2:
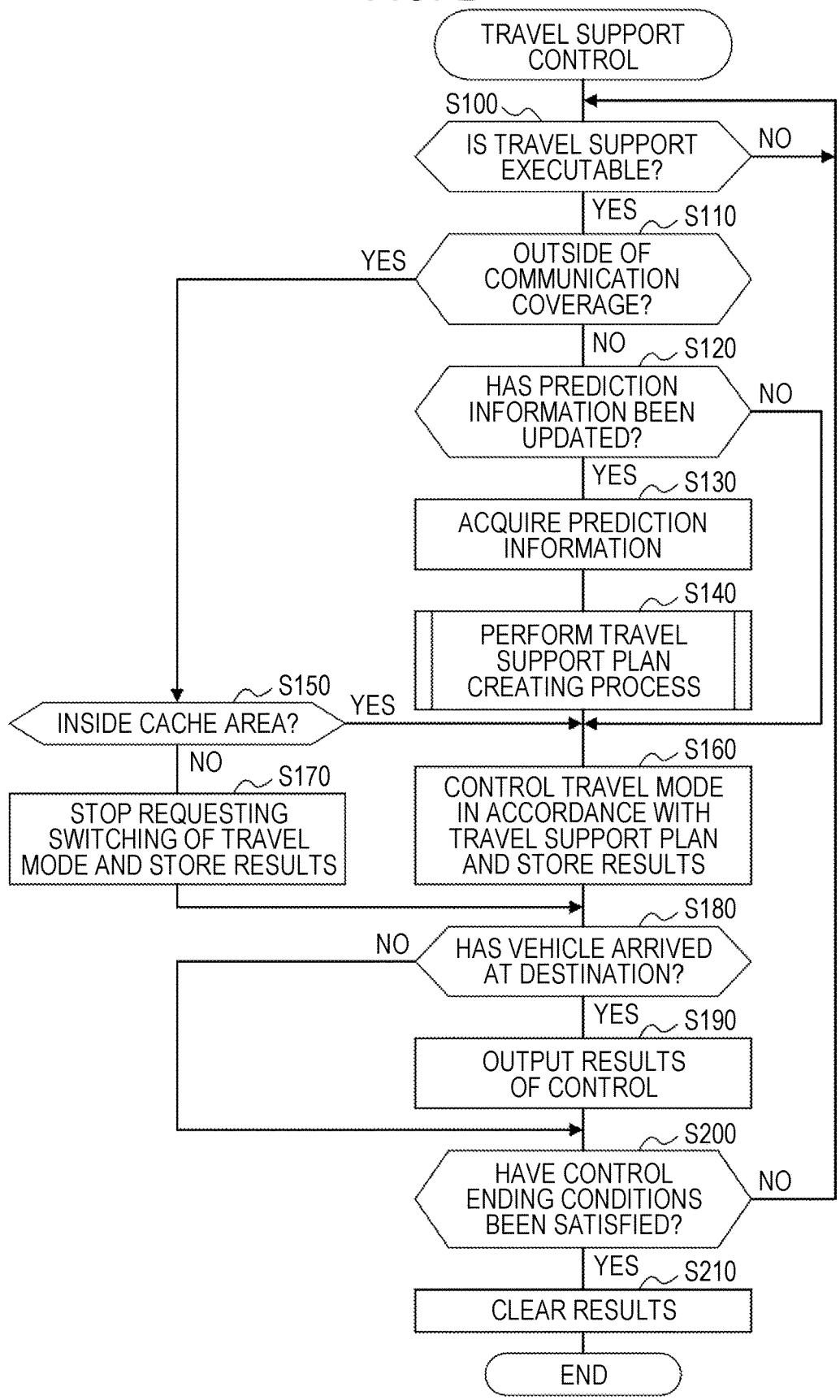
FIG. 2 is a flowchart illustrating an example of travel support control which is performed by the hybrid ECU 50.

Operations of the hybrid electric vehicle 20 having the aforementioned configuration will be described below. FIG. 2 is a flowchart illustrating an example of travel support control which is performed by the hybrid ECU 50. This flowchart is performed after the ignition switch 21 has been turned on.

In the travel support control, first, it is determined whether travel support control is executable (Step S100). Since the travel support control is control in which one of the CD mode and the CS mode is assigned to each travel mode of each section of a route and the host vehicle travels when a route from a current location to a destination is set by the navigation system 80 as described above, the travel support control is not executable when a destination is not set. The travel support control is not executable when route guidance cannot be performed well such as when an abnormality occurs in the navigation system 80 or when an abnormality occurs in the GPS unit 22. When the battery temperature is low, the output limit Wout which is an allowable maximum output electric power which may be able to be output from the battery 40 decreases, the engine EG may be frequently started even when the host vehicle travels in the CD mode, and the host vehicle may not be able to travel appropriately in the CD mode. In Step S100, it is determined whether travel support control is executable due to such circumstances. When it is determined in Step S100 that travel support control is not executable, the routine waits until travel support control becomes executable.

When it is determined in Step S100 that travel support control is executable, it is determined whether the host vehicle is traveling in an area outside of communication coverage in which the host vehicle cannot communicate with the map information management center 110 (Step S120). When it is determined that the host vehicle is traveling in an area within the communication coverage, it is determined whether prediction information transmitted from the navigation system 80 has been updated (Step S110). When it is determined that the prediction information has been updated, the prediction information is acquired (Step S130) and a travel support plan creating process is performed to create a travel support plan (Step S140). An example of the travel support plan creating process is illustrated in FIG. 3.

Figure 3:
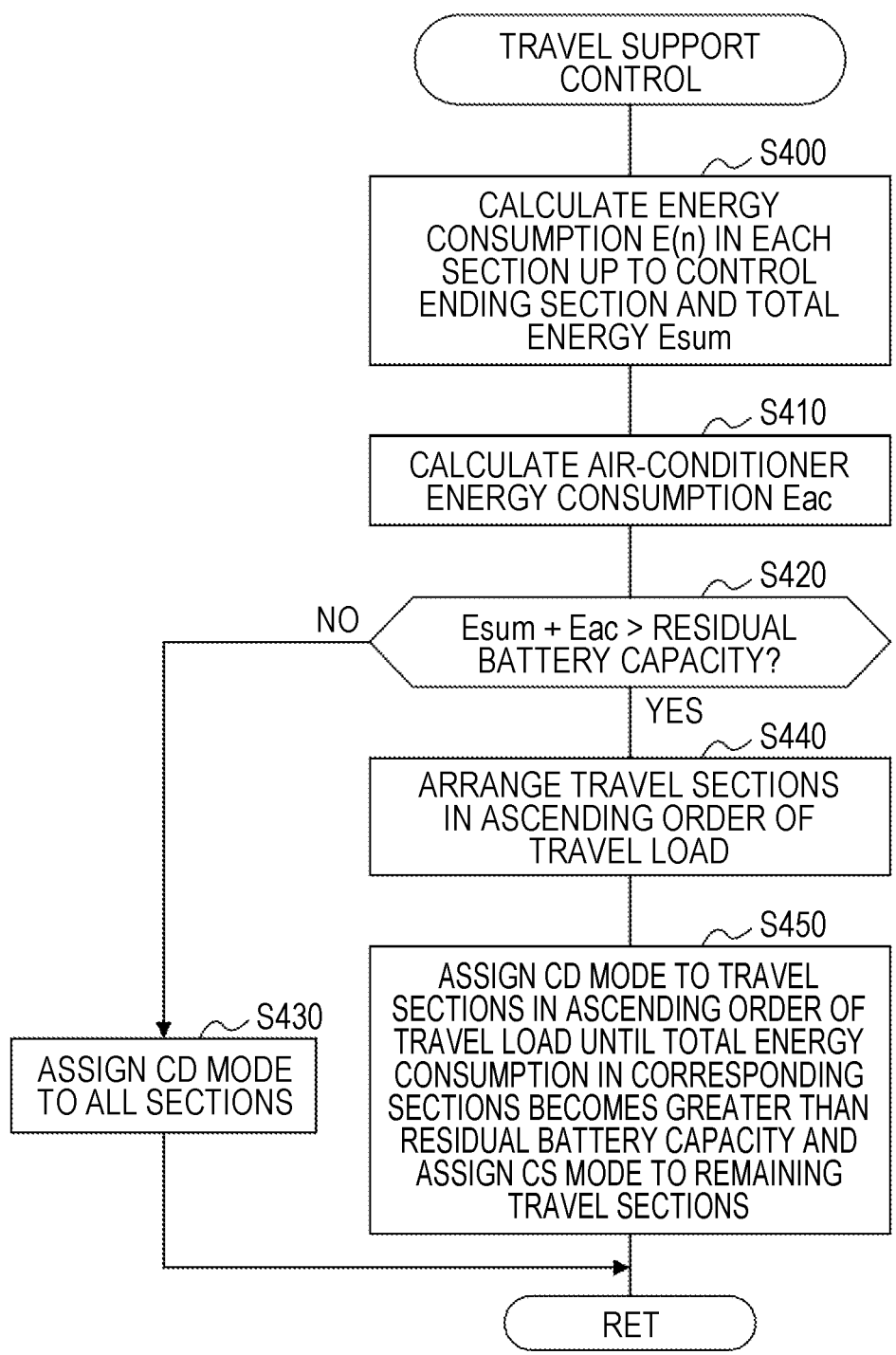
FIG. 3 is a flowchart illustrating an example of a travel support plan creating process which is performed by the hybrid ECU 50.

In the travel support plan creating process illustrated in FIG. 3, first, energy consumption E(n) in each travel section of a travel route from the current location to a control ending section (a destination) and total energy Esum which is a sum thereof are calculated (Step S400). The energy consumption E(n) in each travel section can be determined based on criteria such as whether the travel section is an urban section, a suburban section, or a mountainous section. Then, air-conditioner energy consumption Eac is calculated (Step S410). In this embodiment, the air-conditioner energy consumption Eac is calculated by multiplying power consumption of an air conditioner at that time, predetermined power consumption, maximum power consumption of the air conditioner, or the like by a predetermined time (a time required for traveling 10 km or 15 km). Then, it is determined whether the sum of the total energy Esum and the air-conditioner energy consumption Eac is greater than a residual capacity of the battery 40 (Step S420). The residual capacity of the battery 40 can be calculated by multiplying the full capacity of the battery 40 by the state of charge SOC. When it is determined that the sum of the total energy Esum and the air-conditioner energy consumption Eac is equal to or less than the residual capacity of the battery 40, the CD mode is assigned to the whole travel sections (Step S430). When it is determined that the sum of the total energy Esum and the air-conditioner energy consumption Eac is greater than the residual capacity of the battery 40, the travel sections are arranged in the ascending order of a travel load (an average load in each section) (Step S440), and the CD mode is assigned to the travel sections until the sum of the energy consumption En in the travel sections assigned in the ascending order of the travel load becomes greater than the residual capacity of the battery 40, and the CS mode is assigned to the remaining travel sections (Step S450). That is, the CD mode and the CS mode are assigned to the travel route based on the premise that the sum of the total energy Esum and the air-conditioner energy consumption Eac is greater than a residual capacity of the battery 40.

The travel support control illustrated in FIG. 2 will be described again below. When the travel support plan is created in this way, the travel mode is controlled based on the travel support plan and results of the travel support control (control results) are accumulated (Step S160). Examples of the control results include a traveling distance or a traveling time by electric traveling in the travel support control and a traveling distance or a traveling time by hybrid traveling. The accumulated control results are stored in a flash memory or the like which is not illustrated in the hybrid ECU 50.

Subsequently, it is determined whether the host vehicle has arrived at the destination (Step S180), and control results are output as a display when it is determined that the host vehicle has arrived at the destination. For example, "electric traveling XX km, hybrid traveling YY km" is displayed on the display device 66 assembled into the instrument panel in front of the driver's seat.

When it is determined in Step S180 that the host vehicle has not arrived at the destination or after control results have been output as a display as a result of determination of that the host vehicle has arrived at the destination, it is determined whether travel support control ending conditions have been satisfied (Step S200). Examples of the travel support control ending conditions include a condition that the host vehicle has arrived at the destination, a condition that the residual capacity of the battery 40 has changed due to charging or the like, and a condition that an operation of ending the travel support control has been performed by a driver or the like. When it is determined that the travel support control ending conditions have not been satisfied, the routine returns to the process of determining whether the travel support control is executable in Step S100. When it is determined that the travel support control ending conditions have been satisfied, the control results are deleted (Step S210), and the travel support control ends. When the residual capacity of the battery 40 has changed due to charging or the like, the travel support control ends. When new travel support control is started, this routine is performed again.

When it is determined in Step S110 that the host vehicle is traveling in an area outside of the communication coverage, it is determined whether the host vehicle is traveling in the range of the map information (in a cache area) stored in the map information storage area 84 (Step S150). When it is determined that the host vehicle is traveling in a cache area, the travel mode is controlled based on the travel support plan, results of the travel support control (control results) are accumulated (Step S160), and the processes of Step S180 and steps subsequent thereto are performed.

When it is determined in Step S150 that the host vehicle is not traveling in the cache area, switching the travel mode based on the travel support plan is stopped, results of the travel support control (control results) are accumulated (Step S170), and the processes of Step S180 and steps subsequent thereto are performed. When switching the travel mode based on the travel support plan is stopped, the travel mode (the CD mode or the CS mode) when switching the travel mode has been stopped is maintained.

A case in which the host vehicle is traveling in an area within the communication coverage will be considered. In this case, a travel support plan is created whenever the prediction information is updated, and the travel mode is switched based on the travel support plan. Then, results of the travel support control such as a total distance of electric traveling or a total distance of hybrid traveling are calculated and stored. When the host vehicle moves from an area within the communication coverage to an area outside of the communication coverage and the host vehicle is traveling in the range of the map information (in the cache area) stored in the map information storage area 84, updating of the prediction information or creating of the travel support plan are not performed and the travel mode is switched based on the travel support plan created before the host vehicle travels in the area outside of the communication coverage. In this case, results of the travel support control are also calculated and stored. When the host vehicle travels to the outside of the cache area in an area outside of the communication coverage, switching the travel mode based on the travel support control is stopped and the travel mode at that time is maintained. In this case, results of the travel support control are also calculated and stored. When the host vehicle travels from the outside of the cache area in an area outside of the communication coverage to an area within the communication coverage, switching the travel mode based on the travel support control is restored. In this case, results of the travel support control are also calculated and stored. Accordingly, even when the host vehicle travels in an area within the communication coverage or travels in an area outside of the communication coverage while the travel support control is being performed, results of the travel support control (such as the total distance of electric traveling or the total distance of hybrid traveling) continue to be calculated and stored. The results of the travel support control continue to be calculated and stored. When the host vehicle arrives at a destination, the results of the travel support control are output as a display such as "electric traveling XX km, hybrid traveling YY km" to the display device 66.

In the travel support control device for a hybrid electric vehicle 20 according to the aforementioned embodiment, when the host vehicle travels from an area within the communication coverage to an area outside of the communication coverage and the host vehicle is traveling in a cache area, the travel mode is switched based on the travel support plan created before the host vehicle travels in the area outside of the communication coverage, and results of the travel support control (the total distance of electric traveling or the total distance of hybrid traveling) are calculated and stored. Accordingly, it is possible to more appropriately perform the travel support plan. When the host vehicle travels to the outside of a cache area in an area outside of the communication coverage, switching the travel mode based on the travel support control is stopped, the travel mode at that time is maintained, and results of the travel support control continue to be calculated and stored. Accordingly, it is possible to cope with a case in which the host vehicle travels to the outside of a cache area in an area outside of the communication coverage. When the host vehicle travels from the outside of the cache area in the area outside of the communication coverage to an area within the communication coverage, switching the travel mode based on the travel support control is restored and results of the travel support control continue to be calculated and stored. Accordingly, it is possible to more appropriately perform the travel support plan. When the host vehicle arrives at a destination, the results of the travel support control (the total distance of electric traveling or the total distance of hybrid traveling) continuously calculated even when the host vehicle travels in an area outside of the communication coverage are output and displayed on the display device 66. Accordingly, even when the host vehicle travels in an area outside of the communication coverage, it is possible to notify a driver or the like of the results of the travel support control. As a result, it is possible to more appropriately cope with a case in which the host vehicle travels in an area outside of the communication coverage while the travel support control is being performed.

In the travel support control device for a hybrid electric vehicle 20 according to the embodiment, when the host vehicle is traveling in a cache area in an area outside of the communication coverage, the travel mode is switched based on the travel support plan created before the host vehicle travels in the area outside of the communication coverage and results of the travel support control (the total distance of electric traveling or the total distance of hybrid traveling) are calculated and stored. However, even when the host vehicle is traveling in a cache area which is an area outside of the communication coverage, switching of the travel mode based on the travel support control may be stopped. In this case, it is preferable to continuously calculate and store the results of the travel support control.

In the travel support control device for a hybrid electric vehicle 20 according to the embodiment, when the host vehicle is traveling outside of a cache area in an area outside of the communication coverage, switching the traveling mode based on the travel support control is stopped and the travel mode (the CD mode or the CS mode) for when switching the travel mode has been stopped is maintained. However, a traveling state (electric traveling or hybrid traveling) when switching the travel mode based on the travel support control has been stopped may be maintained, or the traveling state may be switched between electric traveling and hybrid traveling based on the accelerator operation amount, the vehicle speed, and the state of charge SOC of the battery 40.

In the hybrid electric vehicle 20 according to the embodiment, the navigation system 80 sets a travel route from a current location to a destination using the map information acquired from the map information management center 110 based on information of the current location and information of the destination, but the travel route from the current location to the destination may be set in cooperation with the map information management center 110. That is, the navigation system 80 may set a travel route by transmitting information of the current location and information of the destination to the map information management center 110 and receiving the travel route set based on the information of the current location and the information of the destination by the map information management center 110 from the map information management center 110.

Correspondence between principal elements in the embodiment and principal elements of the disclosure described in the SUMMARY will be described below. In the embodiment, the engine EG corresponds to an "engine," the motor MG corresponds to a "motor," the battery 40 corresponds to a "battery," and the hybrid ECU 50 corresponds to a "travel support control device."

Since the embodiment is an example for specifically describing the mode for carrying out the disclosure described in the SUMMARY, the correspondence between principal elements in the embodiment and principal elements of the disclosure described in the SUMMARY does not limit elements of the disclosure described in the SUMMARY. That is, the disclosure described in the SUMMARY should be construed based on description in the SUMMARY, and the embodiment is only a specific example of the disclosure described in the SUMMARY.

While the mode for carrying out the disclosure has been described above with reference to the embodiment, the disclosure is not limited to the embodiment and can be modified in various forms without departing from the gist of the disclosure.

The disclosure is applicable to industry for manufacturing travel support control devices for a hybrid electric vehicle.

What is claimed is:

1. A travel support control device for a hybrid electric vehicle including an engine, a motor, a battery, and a navigation system that receives map information from an external management server by communication, stores the received map information in a map information storage area, and performs route guidance for a travel route from a current location to a destination, the travel support control device performing travel support control in which a travel support plan in which one of travel modes including a charge depleting mode and a charge sustaining mode is assigned to each travel section of the travel route based on prediction information generated for the travel route is created and the hybrid electric vehicle travels according to the travel support plan and calculating a total distance of electric traveling on the travel route as one result of the travel support control, wherein the travel support control device is configured to stop switching the travel mode based on the travel support plan and to keep calculating the total distance of electric traveling on the travel route when the hybrid electric vehicle is traveling in an area outside of communication coverage in which communication between the navigation system and the management server is not possible while the travel support control is being performed, and wherein the travel support control device is configured to resume switching the travel mode based on the travel support plan when the communication between the navigation system and the management server is restored from a state in which switching the travel mode based on the travel support plan is stopped due to the hybrid electric vehicle traveling in an area outside of the communication coverage.

2. The travel support control device according to claim 1, wherein the travel support control device is configured to perform switching the travel mode based on the travel support plan when the hybrid electric vehicle is traveling in an area outside of the communication coverage and in a range of the map information stored in the map information storage area while the travel support control is being performed and to stop switching the travel mode based on the travel support plan when the hybrid electric vehicle is traveling in an area outside of the communication coverage and outside of the range of the map information stored in the map information storage area.

3. The travel support control device according to claim 1, wherein the travel support control device is configured to, in a case where the travel support control device stops switching the travel mode based on the travel support plan, maintain the travel mode in which the hybrid electric vehicle is traveling at a time when switching the travel mode based on the travel support plan is stopped.

4. The travel support control device according to claim 1, wherein the travel support control device is configured to, in a case where the travel support control device stops switching the travel mode based on the travel support plan, maintain a traveling state in which the hybrid electric vehicle is traveling at a time when switching the travel mode based on the travel support plan is stopped.

5. The travel support control device according to claim 1, wherein the travel support control device is configured to notify of the total distance of electric traveling on the travel route when switching the travel mode based on the travel support plan is stopped due to the hybrid electric vehicle traveling in an area outside of the communication coverage and the hybrid electric vehicle has reached the destination.

* * * * *